(12) United States Patent
Peacock et al.

(10) Patent No.: US 11,613,376 B2
(45) Date of Patent: Mar. 28, 2023

(54) AIRCRAFT WING BOX

(71) Applicant: AIRBUS OPERATIONS LIMITED, Bristol (GB)

(72) Inventors: Antony Charles Peacock, Bristol (GB); Ross Salisbury, Bristol (GB); Jonathan Paisley, Bristol (GB); Phillip Scott, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 58 days.

(21) Appl. No.: 17/217,564

(22) Filed: Mar. 30, 2021

(65) Prior Publication Data
US 2021/0300581 A1 Sep. 30, 2021

(30) Foreign Application Priority Data

Mar. 31, 2020 (GB) .................................. 2004722

(51) Int. Cl.
| | |
|---|---|
| *B64D 37/04* | (2006.01) |
| *B64C 3/18* | (2006.01) |
| *B64D 37/08* | (2006.01) |
| *B64C 3/34* | (2006.01) |

(52) U.S. Cl.
CPC .............. *B64D 37/04* (2013.01); *B64C 3/185* (2013.01); *B64C 3/34* (2013.01); *B64D 37/08* (2013.01)

(58) Field of Classification Search
CPC .................................. B64C 3/34; B64D 37/08
See application file for complete search history.

(56) References Cited

U.S. PATENT DOCUMENTS

| | | | |
|---|---|---|---|
| 4,556,592 | A | 12/1985 | Bannink, Jr. |
| 2010/0051749 | A1 | 3/2010 | Tanner |
| 2019/0329860 | A1 | 10/2019 | Williams |

FOREIGN PATENT DOCUMENTS

| | | |
|---|---|---|
| EP | 2 965 983 | 1/2016 |
| EP | 3 173 339 | 5/2017 |
| EP | 3 461 747 | 4/2019 |
| WO | 2009/050510 | 4/2009 |

OTHER PUBLICATIONS

Combined Search and Examination Report for GB Application No. 2004722.1 dated Jan. 7, 2021, 12 pages.

*Primary Examiner* — Timothy D Collins
*Assistant Examiner* — Eric Acosta
(74) *Attorney, Agent, or Firm* — Nixon & Vanderhye P.C.

(57) ABSTRACT

An aircraft wing box is disclosed having a fuel tank with a fuel-tight boundary, upper and lower covers, forward and aft spars, and a partition including an inboard portion, an outboard portion, and a third portion between the inboard and outboard portions. Each cover is attached to each spar, the inboard portion of the partition is joined to each cover and joined to one of the spars, the outboard portion of the partition is joined to each cover and joined to one of the spars, each cover is joined to the partition. The inboard part, outboard part and third part of the partition are integrally formed as a single-piece; and the single-piece provides part of the fuel-tight boundary of the fuel tank.

15 Claims, 12 Drawing Sheets

AIRCRAFT WING BOX

CROSS REFERENCE TO RELATED APPLICATION

This application claims priority to United Kingdom Patent Application GB 2004722.1, filed Mar. 31, 2020, the entire contents of which is hereby incorporated by reference.

FIELD OF THE INVENTION

The present invention relates to an aircraft wing box having a fuel-tight boundary, and a method of manufacturing the wing box.

BACKGROUND OF THE INVENTION

Boundaries between sections of a fuel tank system in an aircraft wing require fuel-tight sealing. Each seal formed between adjacent parts of the fuel boundary needs to be carefully manufactured to form the fuel-tight boundary, and subsequently each seal needs to be regularly inspected and maintained to ensure that the seal remains fuel-tight. This requires a significant amount of time and effort.

SUMMARY OF THE INVENTION

A first aspect of the invention provides an aircraft wing box comprising: a fuel tank with a fuel-tight boundary; upper and lower covers; forward and aft spars; and a partition which provides part of the fuel-tight boundary of the fuel tank, the partition comprising an inboard portion, an outboard portion, and an intermediate portion between the inboard and outboard portions, wherein: each cover is attached to each spar; the inboard portion of the partition is joined to each cover and joined to one of the spars; the outboard portion of the partition is joined to each cover and joined to one of the spars; each cover is joined to the partition; and the inboard, outboard and intermediate portions of the partition are integrally formed as a single-piece.

A second aspect of the invention provides an aircraft wing box, comprising: a root and a tip, the wing box extending from the tip to the root in a spanwise direction, a forward spar and a aft spar spaced apart in a chordwise direction, and an upper cover and a lower cover each extending between the front and aft spars, a fuel-tight partition comprising a first portion extending in a substantially chordwise direction, a second portion extending in a substantially chordwise direction, and a third portion between the first and second chordwise portions and extending in a substantially spanwise direction, wherein the first, second and third portions are integral with each other.

A further aspect of the invention provides a method of manufacturing the wing box of the first or second aspect, the method comprising machining, casting, pressing, co-curing or moulding material to form the partition as a single piece; and installing the partition the partition in the wing box.

By way of non-limiting example, the partition may be machined or cast from a single piece of metal material, or moulded as a single piece by hot isostatic pressing. Alternatively the partition may be formed from a single fibre preform which is infused with a matrix material.

The following comments apply to each aspect of the invention, where applicable.

Forming the portions of the partition integrally with each other provides two advantages. Firstly, it makes the wing box quicker and easier to assemble since the partition can be installed into the wing box as a single modular unit. Secondly, it makes the partition less prone to fuel leakage since it is not necessary to seal the junctions where the portions of the partition meet.

Typically the wing box has a root and a tip, and the inboard/first portion of the partition is closer to the root of the wing box than the outboard/second portion.

The forward spar may form a front boundary of the wing box, or it may be a centre spar of the wing box.

The aft spar may form a rear boundary of the wing box, or it may be a centre spar of the wing box.

A part of the fuel-tight boundary may be formed by one of the spars.

The covers and one or both of the spars may provide part of the fuel-tight boundary of the fuel tank.

In some embodiments the inboard/first portion is joined to one of the spars and the outboard/second portion is joined to the other one of the spars. In a preferred embodiment the inboard/first portion is joined to the aft spar and the outboard/second portion is joined to the forward spar.

Alternatively the inboard/first portion and the outboard/second portion may be joined to the same one of the spars. In a preferred embodiment the inboard/first portion and the outboard/second portion are both joined to the forward spar. In this case the second/intermediate portion may have a curved concave forward surface facing the forward spar and a curved convex aft surface facing away from the forward spar.

At least one of the covers may be integrally formed as a single piece with at least one of the spars.

The intermediate/third portion of the partition may comprise a diaphragm with a planar diaphragm web.

The fuel-tight boundary may be a boundary between two adjacent fuel bays arranged to hold fuel, for instance an inboard fuel bay and an outboard fuel bay.

Alternatively the fuel-tight boundary may be a boundary between a fuel bay arranged to hold fuel and a dry bay arranged to be free of fuel.

The partition may comprise at least one foot or flange attached to the upper cover and at least one foot or flange attached to the lower cover, wherein each foot or flange is integrally formed with the rest of the partition as a single-piece.

The inboard portion may have a post or flange attached to one of the forward spar and aft spar, the outboard portion may have a post or flange attached to one of the forward spar and aft spar, and each post or flange may be integrally formed with the rest of the partition as a single-piece.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
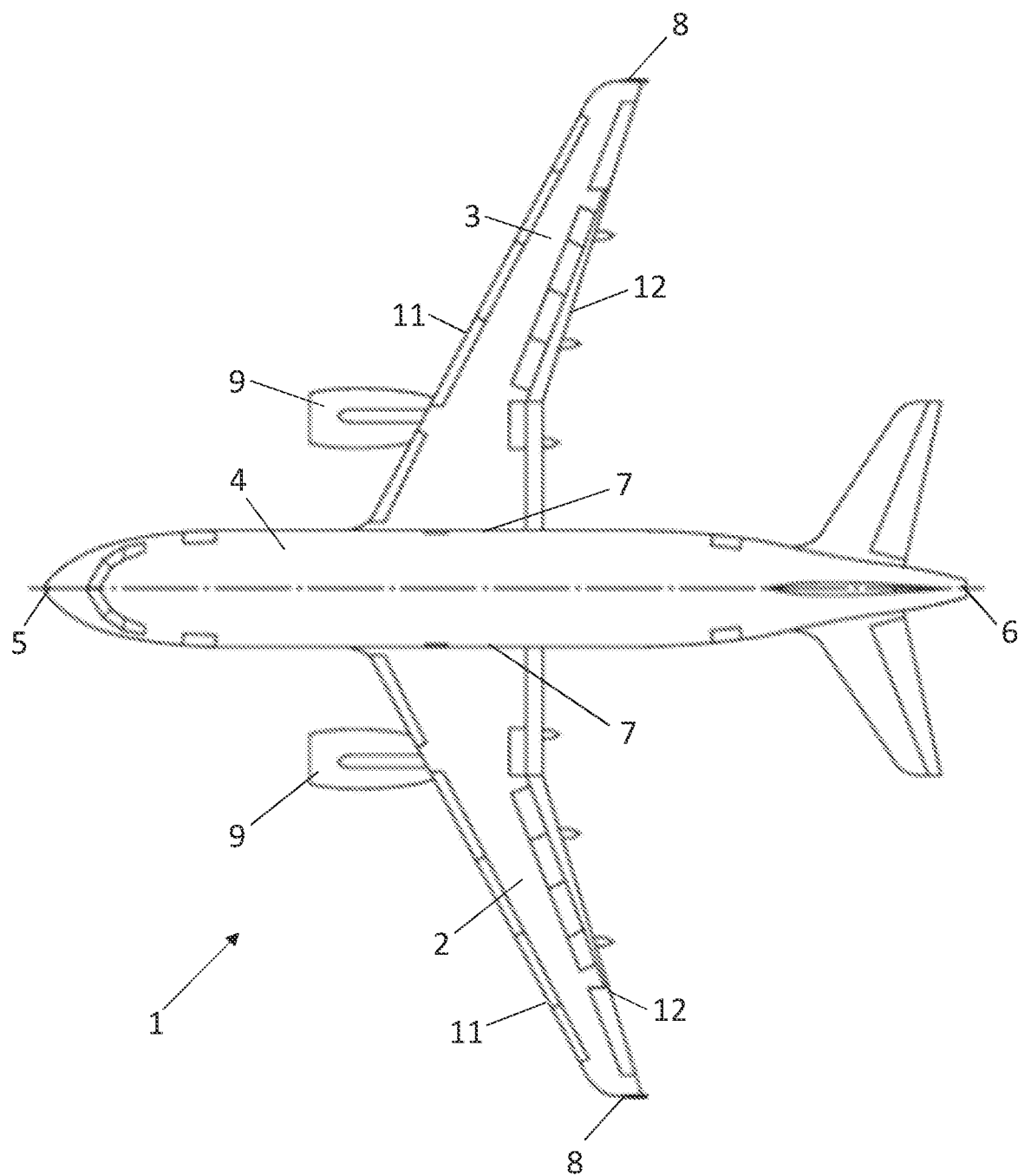
FIG. 1 shows a plan view of an aircraft.

FIG. 1 shows an aircraft 1 with port and starboard fixed wings 2, 3, and a fuselage 4 with a nose 5 and a tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines 9 attached to the wings or fuselage.

Each wing 2, 3 has a cantilevered structure with a length extending in a span-wise direction from a wing root 7 to a wing tip 8, the wing root 7 being joined to the fuselage 4. The wings 2, 3 are similar in construction so only the port wing 2 will be described in detail with reference to the following Figures.

In the following description, the terms "front" or "forward" refer to components towards a leading edge 11 of the wing, and the terms "rear" or "aft" refer to components towards a trailing edge 12 of the wing. The position of features may be construed relative to other features, for example a forward component may be disposed on a forward side of another component, but towards the rear of the vehicle. Similarly, the terms "upper" and "lower" refer to the position of features relative to other features and in accordance with a normal orientation of the aircraft 1. Similarly, the terms "inboard" and "outboard" refer to the relative positions of features in the spanwise direction of the wing box. That is, an inboard component is closer to the root of the wing box than an outboard component, and an outboard component is closer to the tip of the wing box than an inboard component.

Figure 2:
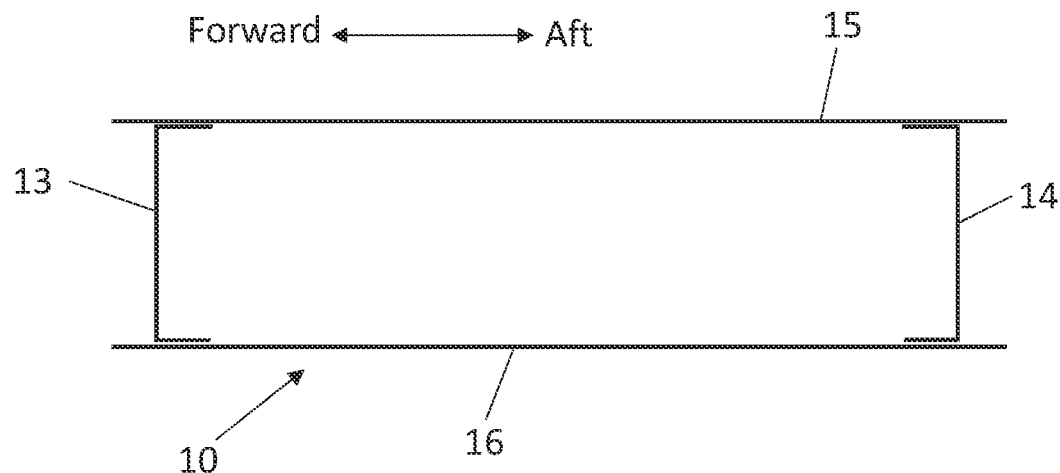
FIG. 2 shows a schematic view of the wing box of the port wing.

FIG. 2 shows a schematic view of a wing box 10 of the port wing 2 of the aircraft 1. The wing box 10 is a support structure arranged to support a significant proportion of the loads on the wing 2. The wing box 10 has a forward spar 13 which forms the front boundary of the wing box, an aft spar 14 which forms the rear boundary of the wing box, an upper cover 15, and a lower cover 16.

Each of the elements 13-16 of the wing box extends substantially the entire length of the wing 2 from a root 7a of the wing box 10 (which typically coincides with the root 7 of the wing 2) to a tip 8a of the wing box 10 (which may coincide with the tip 8 of the wing 2, or the tip 8 of the wing may be a wingtip device such as a winglet). The upper cover 15 and lower cover 16 have outer aerodynamic surfaces. The wing 2 also includes a leading edge structure (not shown) and a trailing edge structure (not shown) that are aerodynamically shaped to combine with the wing box 10 to form an aerofoil shaped body.

The covers 15, 16 may be reinforced with stringers. Stringers are typically spanwise extending reinforcing members attached to the inside of the covers 15, 16.

Figure 3:
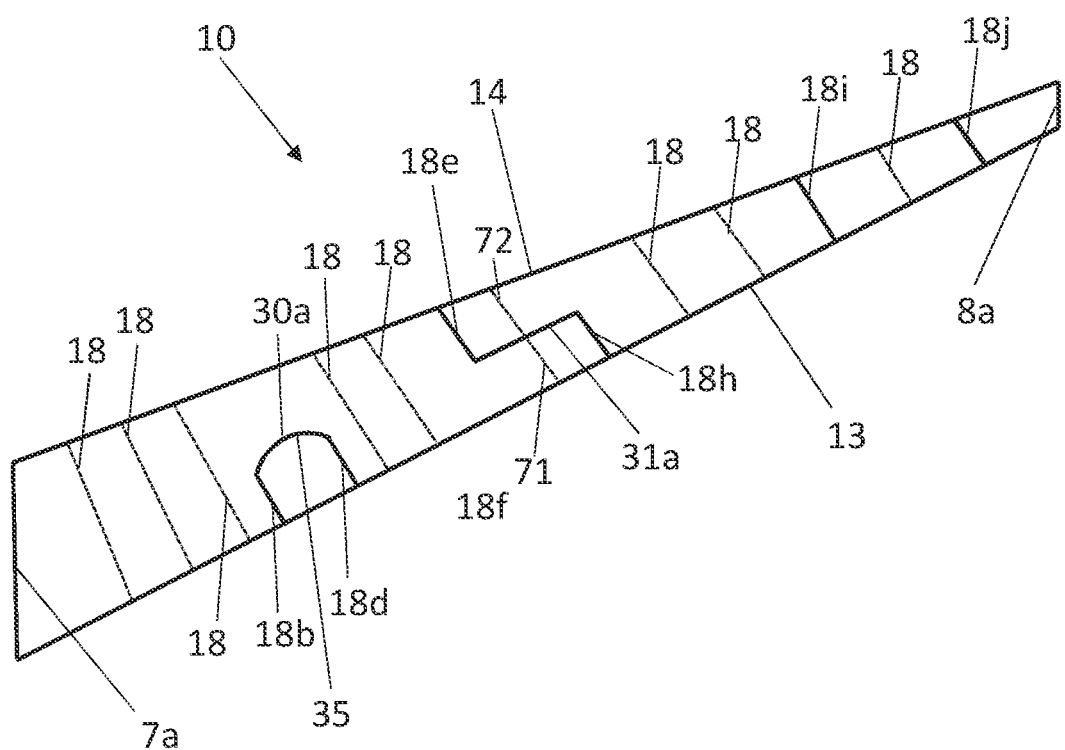
FIG. 3 is a plan view showing an arrangement of ribs and fuel tank boundaries along the wing box of the port wing.

As shown in FIG. 3, the wing box 10 also includes a plurality of chordwise ribs extending between the spars 13, 14 and between the covers 15, 16. The ribs are spaced along the spanwise direction of the wing 2, with each rib defining a rib plane. The rib plane of each rib extends substantially parallel to each adjacent rib plane, although it will be understood that the orientation of adjacent ribs with respect to each other may vary. The ribs are arranged as part of an aircraft fuel system, such that some of the ribs are baffle ribs 18, 71, 72 designed to allow at least some free-flow of fuel across the rib plane (indicated by a dotted line), and some ribs 18i, 18j are fully sealed to form a fuel-tight boundary substantially preventing fuel freely flowing across the rib plane (indicated by a solid line).

The number of baffle ribs 18 may vary from what is shown in FIG. 3, which is schematic only.

Figure 4:
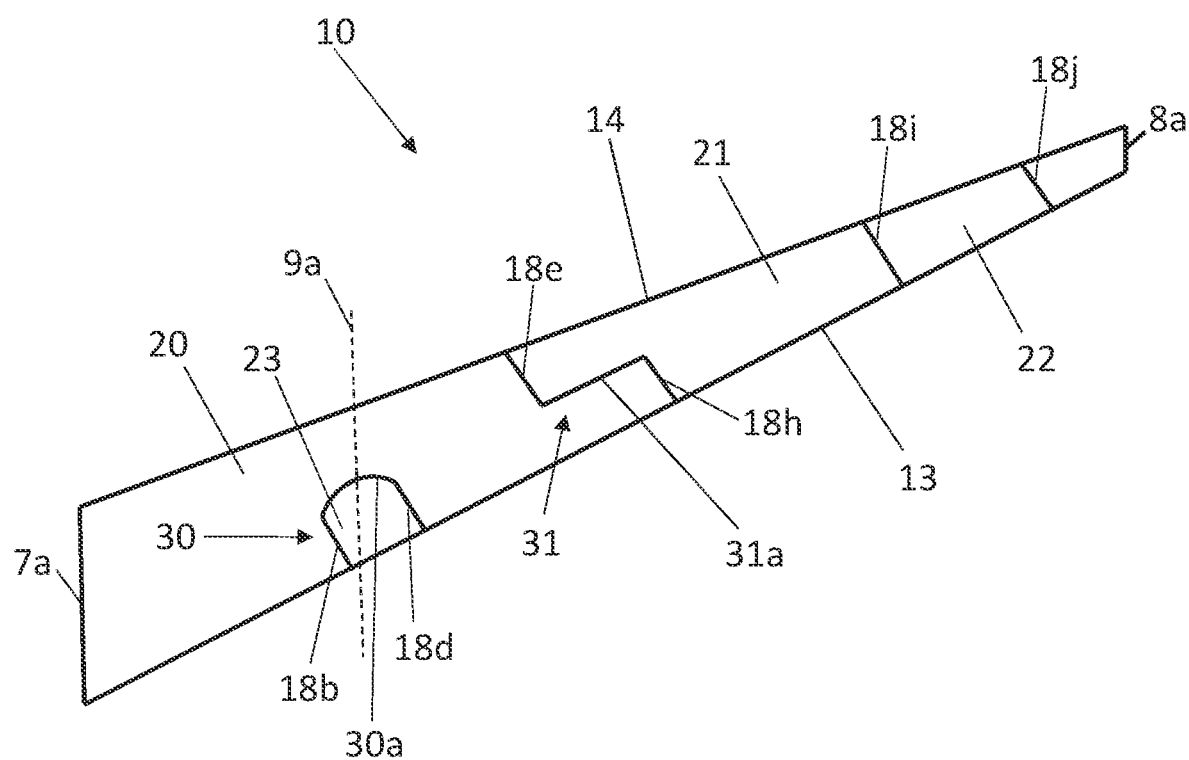
FIG. 4 is a plan view of the fuel tank arrangement of the port wing.

FIG. 4 shows a plan view of the wing box 10 in which only the sealed ribs 18i, 18j and other sealed parts 18b, 18d, 18e, 18h, 30a, 31a forming a fuel-tight boundary are shown.

The wing box 10 contains an inner tank 20, an outer tank 21, and a vent tank 22, shown in FIG. 4. The inner wing tank 20 is adjacent the root 7a of the wing box 10, the outer wing tank 21 is generally outboard of the inner wing tank 20, and the vent tank 22 is located outboard of the outer wing tank 21 and towards the tip 8a of the wing box 10. Each of these tanks 20, 21, 22 forms part of an aircraft fuel system that supplies fuel to the engines 9.

Each of the fuel tanks 20, 21, 22 is bounded by a fuel-tight boundary. Some portions of the fuel-tight boundary are external parts of the wing box (for example covers and spars) and other are internal (for instance ribs etc). The internal portions of the fuel-tight boundary are referred to below as partitions, since they provide a partition between internal spaces within the wing box.

The upper and lower portions of the fuel-tight boundary of each fuel tank are provided by the covers 15, 16; and the forward and rear portions of the boundary of each fuel tank are provided by the spars 13, 14.

The partition between the outer tank 21 and the vent tank 22 is formed by an outboard rib 18i that prevents fuel freely flowing between the two respective tanks 21, 22. The partition 31 between the inner tank 20 and the outer tank 21 is formed by a rearward portion 18e of a first (inboard) rib; a forward portion 18h of a second (outboard) rib; and a diaphragm 31a extending between the first and second ribs.

The partition 31 between the inner and outer fuel tanks 20, 21 is therefore Z-shaped, having a first portion 18e (inboard portion) extending in a substantially chordwise direction, a second portion 18h (outboard portion) extending in a substantially chordwise direction, and an intermediate third portion (diaphragm 31b) between the first and second chordwise portions 18e, 18h extending in a substantially spanwise direction.

The wingbox 10 also includes a dry-bay 23 adjacent to the engine 9. The engine's centre-line is indicated by a dashed line 9a. The boundary between the inner fuel tank 20 and the dry-bay 23 is a fuel-tight partition 30 ensuring that fuel from the inner tank 20 is prevented from leaking into the dry-bay 23. The partition 30 is formed by an inboard portion (partition wall 18b); an outboard portion (partition wall 18d); and an intermediate portion (rear wall 30a) between the inboard and outboard walls 18b, 18d.

As noted above, FIG. 3 is schematic only and the size of the dry-bay 23 may be smaller than shown.

The design of this fuel tank lay-out, including the position of the dry-bay 23, is partly driven by certification requirements relating to unconstrained engine rotor failure, and so is at least partially dependent on the position of the wing-mounted engine. Fuel tank layouts may also necessitate consideration of, e.g., individual fuel tank volumes, weight distribution across the wings 2, 3, and fuel system routing (e.g. fuel lines), among a number of other factors. In this particular case, this has resulted in complex shaped fuel tank boundaries that are assembled from many different parts. Each connection between components at the fuel-tight boundary of a partition creates an additional interface that needs to be sealed.

Figure 5:
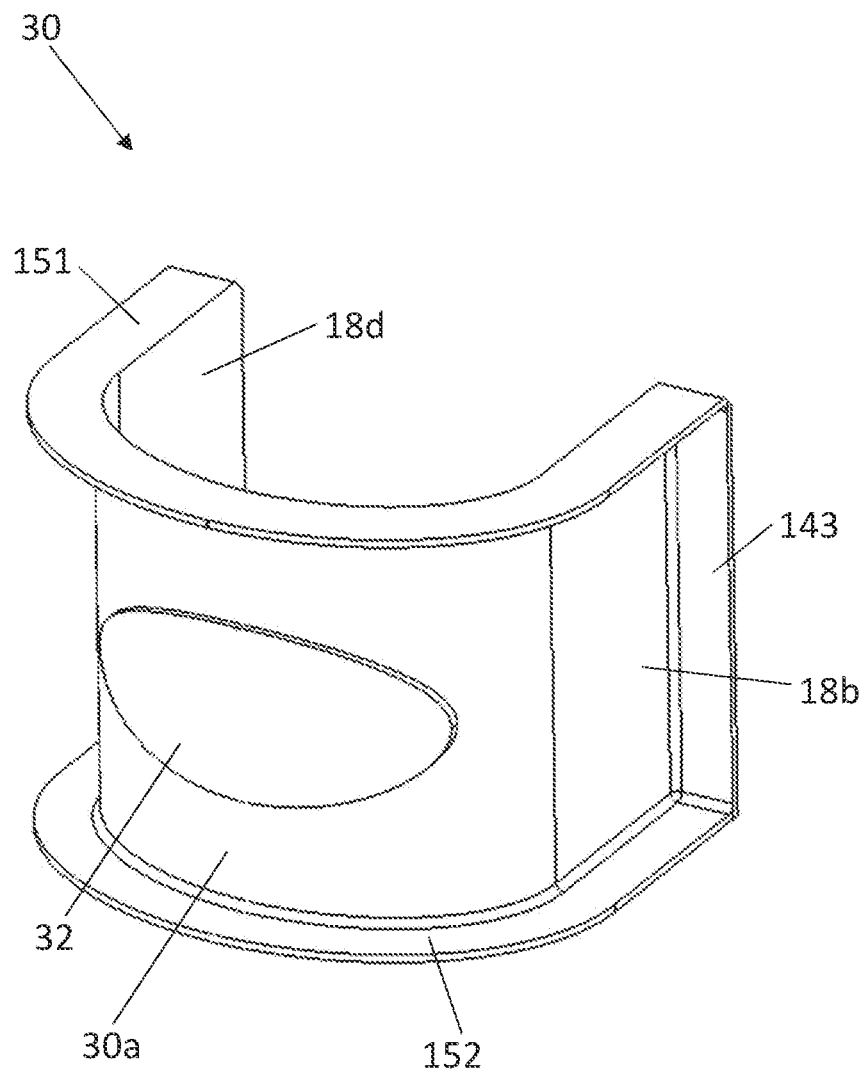
FIG. 5 shows a dry-bay partition according to a first example.
Figure 6:
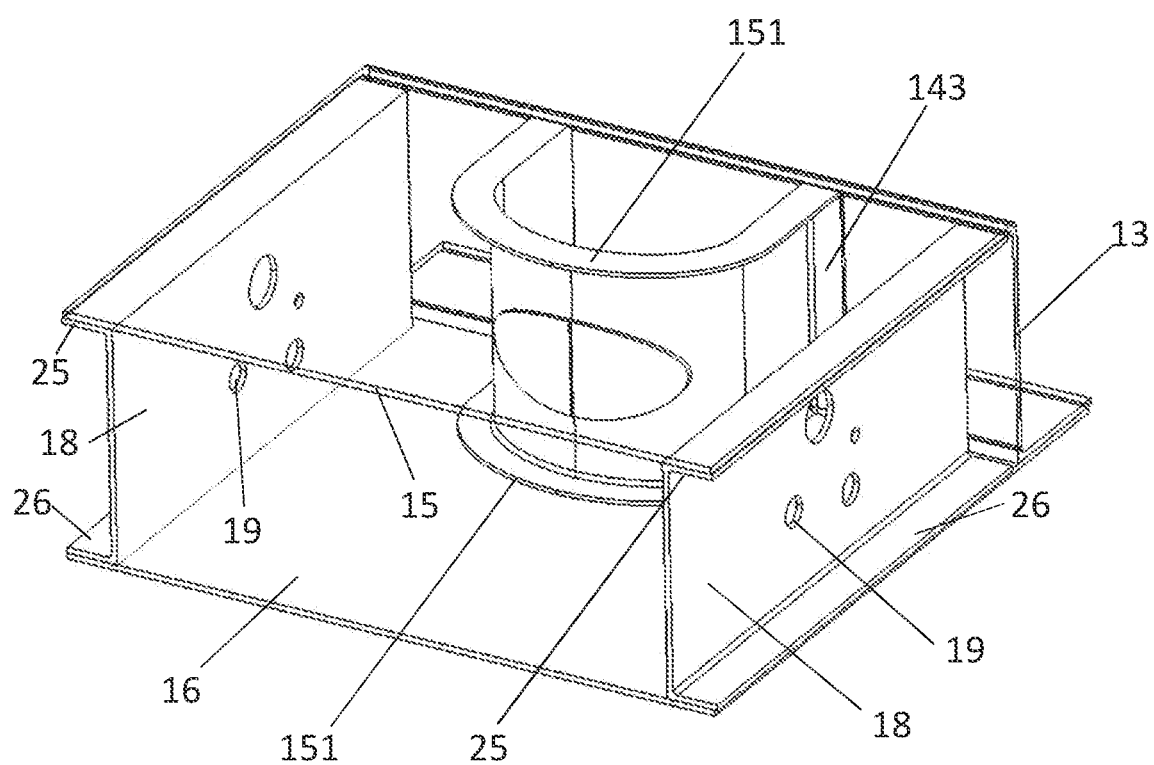
FIG. 6 shows the partition of the first example in the wing, with the upper cover rendered transparent so the internal parts can be seen.

FIGS. 5 and 6 shows the dry-bay partition 30 in detail. The partition 30 has a generally 'U' shaped profile, with the rear wall 30a having a curved surface that continuously curves between the planar inboard and outboard portions 18b, 18d.

The rear wall 30a has a curved concave forward surface facing the forward spar and a curved convex aft surface facing away from the forward spar. The curved concave forward surface is labelled 35 in FIG. 3. The curved convex aft surface is the surface visible in FIGS. 5 and 6. The rear wall 30a has a manhole, closed by a manhole cover 32.

The curved profile of the rear wall 30a improves structural efficiency, reducing stress concentrations that would otherwise build up at sharp edges/corners, and helping to resist the loads generated by fuel slosh and pulse loads—particularly pulse loads during a rapid deceleration of the aircraft which may cause fuel to rush towards the forward spar 13.

As shown most clearly in FIG. 6, the partition 30 has an upper U-shaped flange 151 which is joined to the upper cover 15 by a sealed joint; and a lower U-shaped flange 152 which is joined to the lower cover 16 by a sealed joint.

The partition 30 also has an inboard flange 143 which is joined to the forward spar 13 by a sealed joint; and a similar outboard flange (not visible) which is joined to the forward spar 13 by a sealed joint.

All parts 18b, 30a, 18d, 151, 152, 143 of the partition 30 shown in FIG. 5 (apart from the manhole cover 32) are integrally formed as a single-piece. For example, the partition 30 may be machined from a block of aluminium, cast as a single-piece, or moulded as a single piece by hot isostatic pressing (HIP). The HIP process may subject metal powder to both elevated temperature and isostatic gas pressure in a high pressure containment vessel.

Forming the partition 30 from a single-piece of material reduces the number of sealed joints required, which makes assembly of the wing box quicker and easier. In the example of FIG. 6 only six sealed joints are required for the entire boundary of the dry bay: two joints between the partition 30 and the covers 15, 16; two joints between the partition 30 and the forward spar 13; and two joints between the forward spar 13 and the covers 15, 16.

Figure 7:
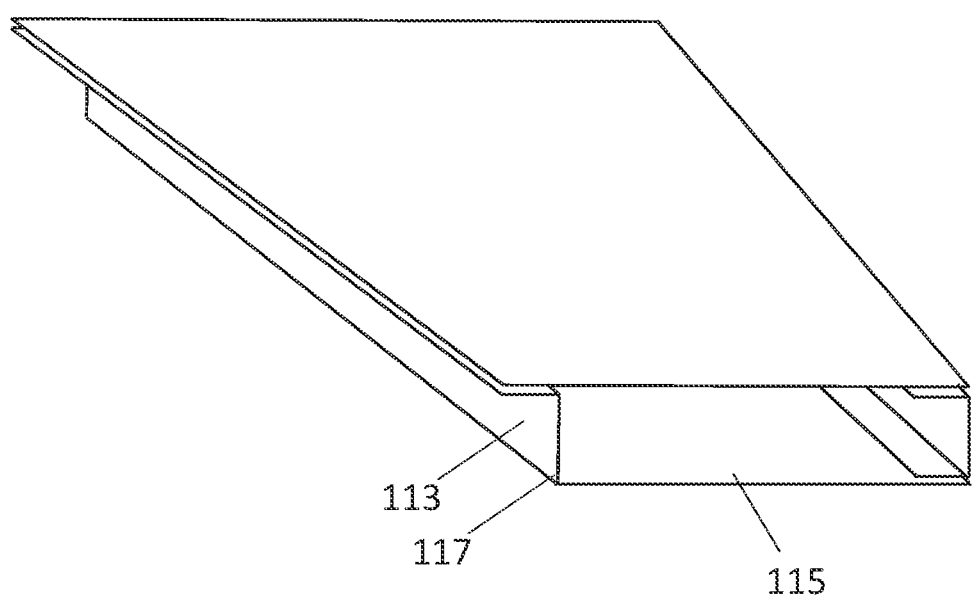
FIG. 7 shows a schematic view of a wing box with an integrated spar-cover.

The number of sealed joints can be further reduced to five by integrally forming the forward spar 13 and one of the covers 15, 16 as a single piece, as described for example in US 2019/0329860. FIG. 7 shows a wing box with such an arrangement. In this case the forward spar 113 and upper cover 115 are integrally formed to form a spar-cover such that the composite laminate material of the spar extends continuously into the cover through a fold region 117 between the spar and the cover. There is no need to seal the fold region 117 to prevent fuel leakage.

Whilst the partition 30 may have at least some vertical load carrying capacity (e.g. aerodynamic loads transmitted from the upper and lower covers), the majority of the loads in this particular example are taken by adjacent baffle ribs 18 inboard and outboard of the partition 30, each of which connects to the upper and lower covers by respective upper and lower rib feet 25, 26 as shown in FIG. 6.

Figure 8:
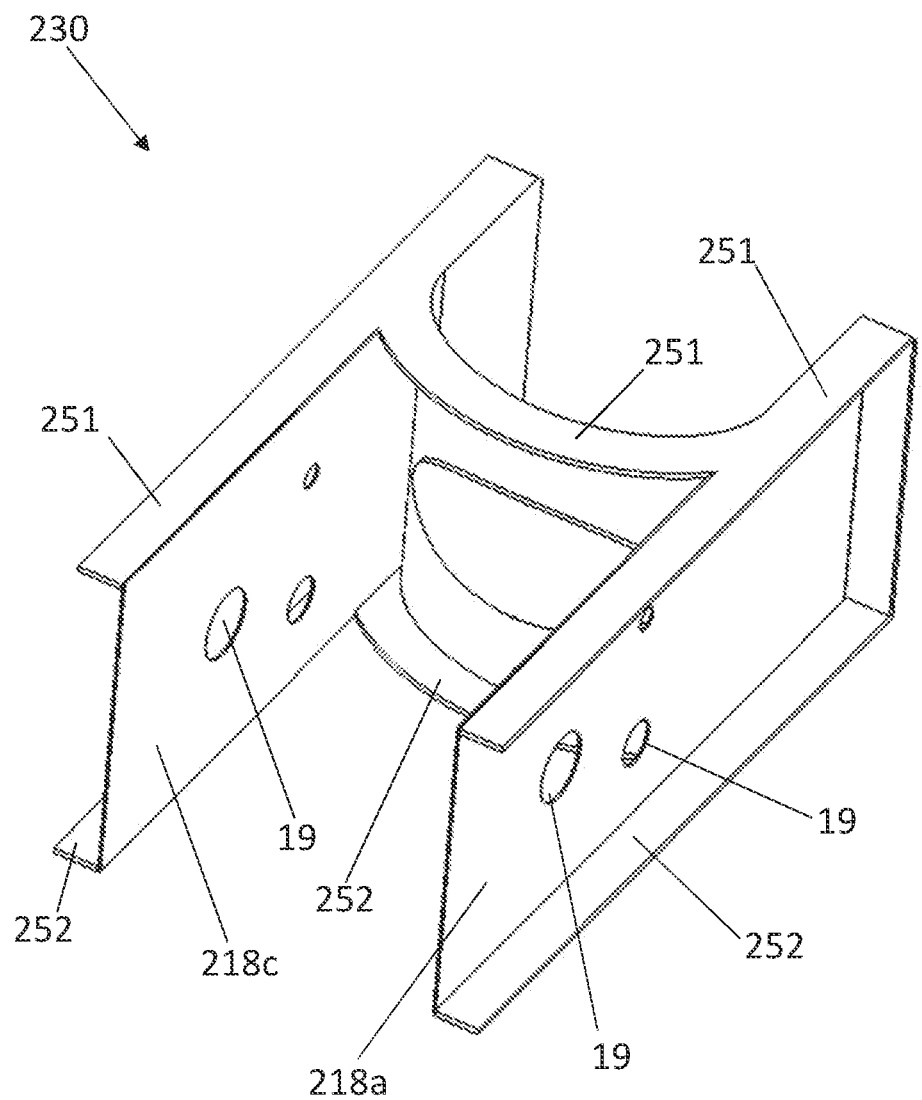
FIG. 8 shows a dry-bay partition according to a second example.

In an alternative example shown in FIG. 8, the dry bay partition may be formed integrally as a single modular unit 230 which includes baffle ribs 218a, 218c which are joined to the aft spar 14 so that the unit 230 has a generally 'H' shaped profile.

The unit 230 has an H-shaped upper flange 251 which is joined to the upper cover 15 by a sealed joint; and an H-shaped lower flange 252 which is joined to the lower cover 16 by a sealed joint.

The baffle ribs 218a, 218c each include a number of holes 19 that allow fuel to freely flow between the fuel bays either side of the rib plane. The baffle ribs 218a, 218c may also have flanges (not shown) which are joined to the aft spar 14.

All parts of the unit 230 shown in FIG. 8 (apart from the manhole cover) are integrally formed as a single-piece. For example, the unit 230 may be machined from a block of aluminium, cast as a single-piece, or moulded as a single piece by hot isostatic pressing (HIP).

Unlike the partition 30, the unit 230 may be engineered to withstand vertical loads transferred from the upper and lower covers.

Figure 9:
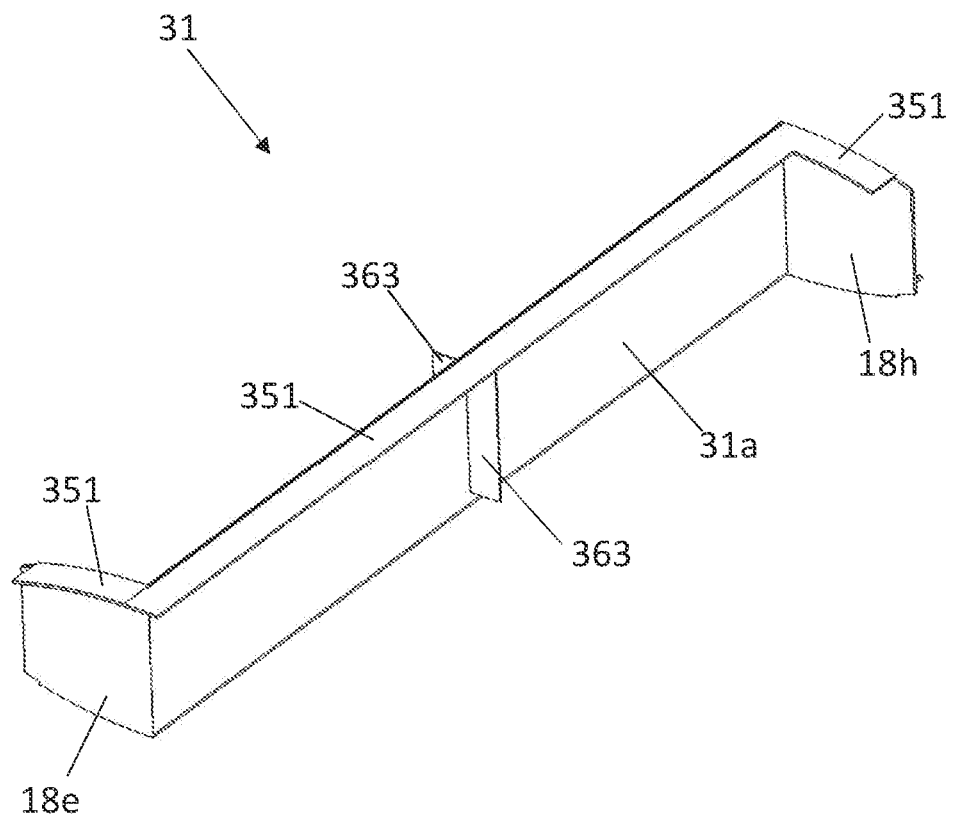
FIG. 9 shows a partition according to a third example.
Figure 10:
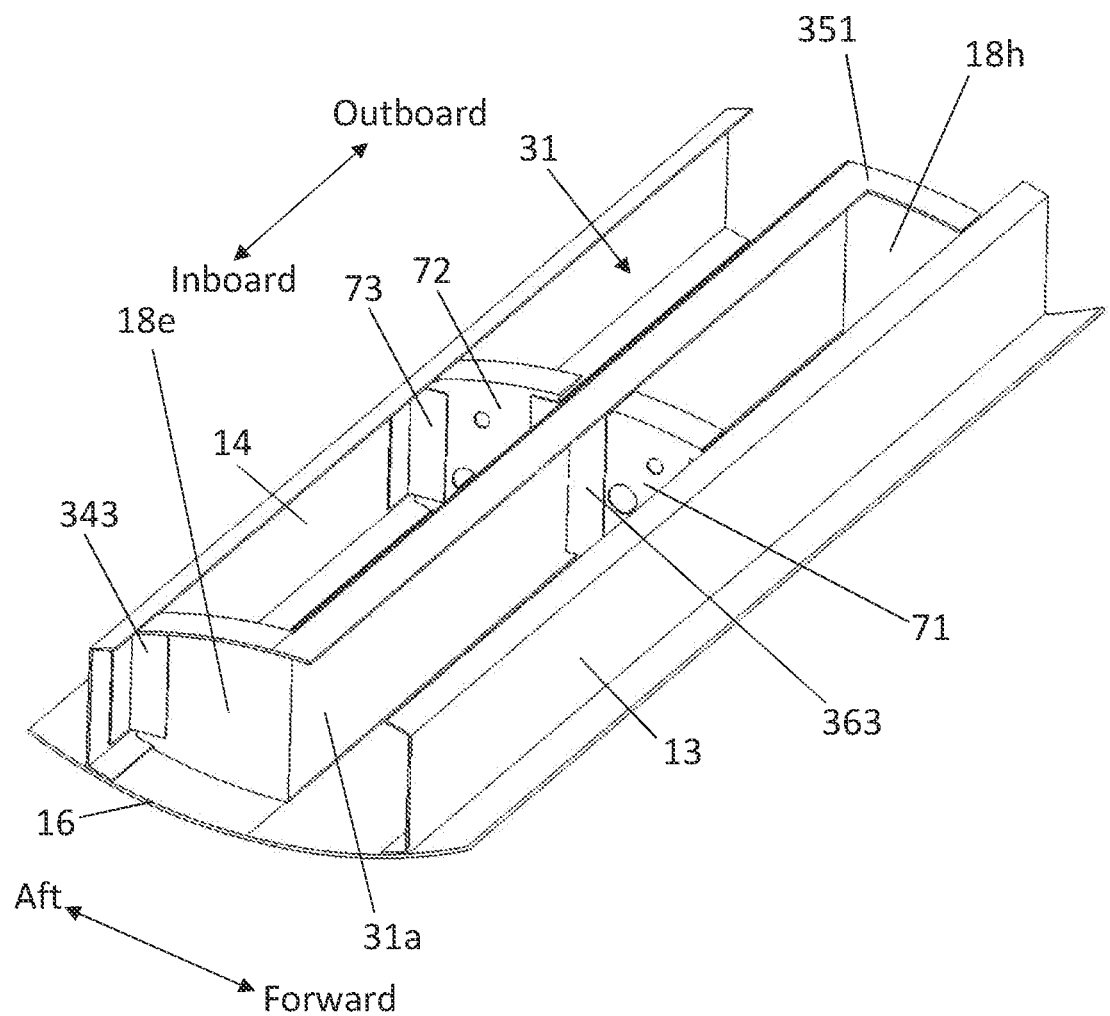
FIG. 10 shows the partition of the third example in the wing box of FIG. 2.

FIGS. 9 and 10 show the Z-shaped partition 31 between the inner and outer fuel tanks 21, 22.

The partition 30 has an inboard portion 18e, an outboard portion 18h and a diaphragm 31a.

The partition 30 has a Z-shaped upper flange 351 which is joined to the upper cover 15 by a sealed joint; and a Z-shaped lower flange (not visible in the views of FIGS. 9 and 10) which is joined to the lower cover 16 by a sealed joint.

The partition 30 also has a pair of rib posts 363 which are attached to the inner edges of the baffle half-ribs 71, 72 as shown in FIG. 10. The outer edges of the baffle half-ribs 71, 72 are attached to the forward and aft spars respectively by rib posts 73. This joint does not need to be sealed.

The inboard portion 18e has a planar web which extends in a substantially chordwise direction and is joined to the aft spar 14 by a fuel tight joint with a rib post 343. The outboard portion 18h has a planar web which extends in a substantially chordwise direction and is joined to the forward spar 13 by a fuel tight joint with a rib post similar to the rib post 343.

The diaphragm 31a has a planar web which extends in a substantially spanwise direction.

All parts 18e, 31a, 18h, 351, 363 of the partition 31 shown in FIG. 9 are integrally formed as a single-piece. For example, the partition 31 may be machined from a block of aluminium, cast as a single-piece, or moulded as a single piece by hot isostatic pressing (HIP).

In this particular example the half-ribs 71, 72 and rib posts 73 are separately formed from the partition 31 and attached to the partition by fasteners, co-curing or co-bonding. In an alternative example, the half-ribs 71, 72 and rib posts 73 may be formed integrally with the partition 31 as a single-piece.

Figure 11:
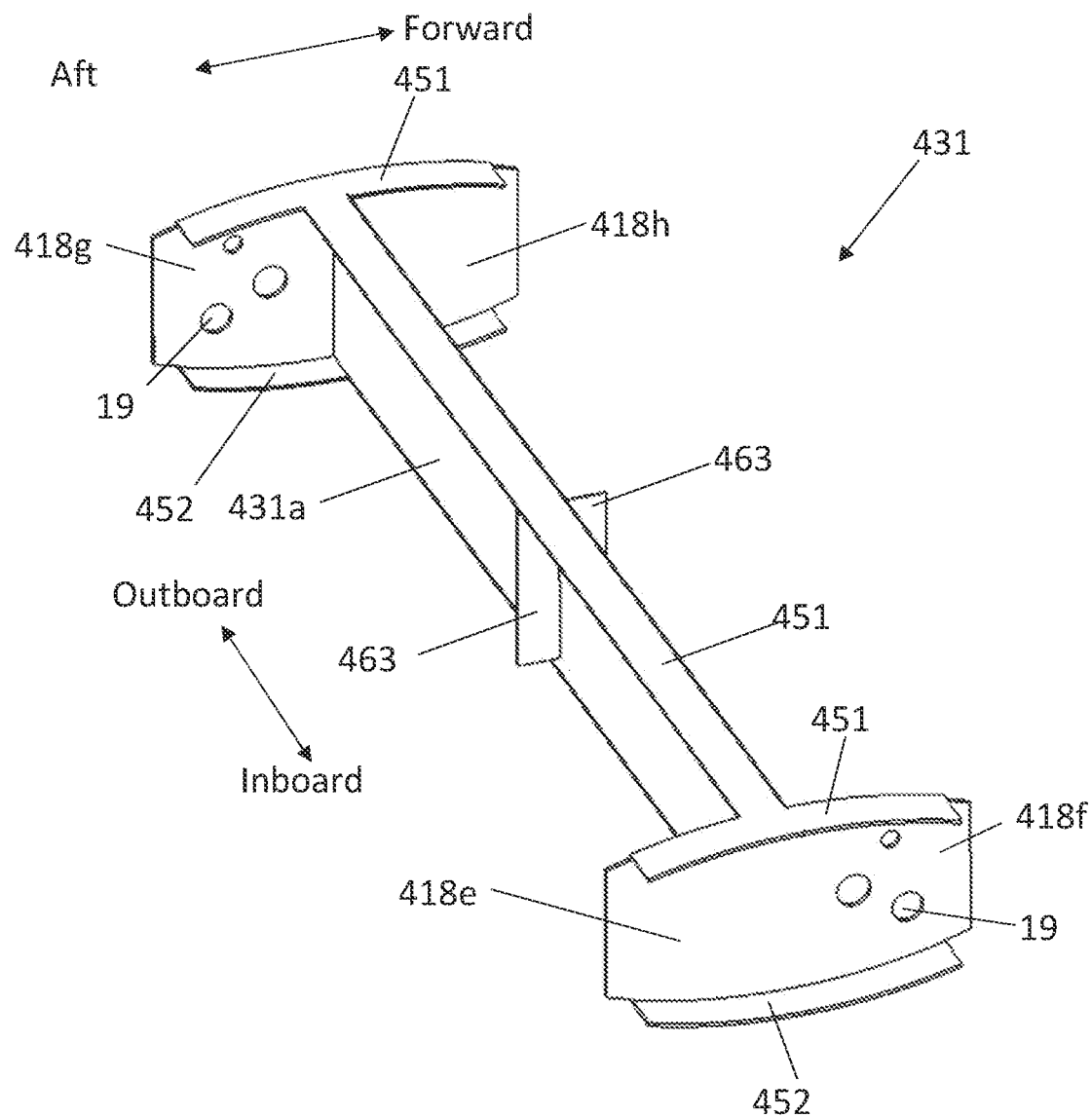
FIG. 11 shows a partition according to a fourth example.
Figure 12:
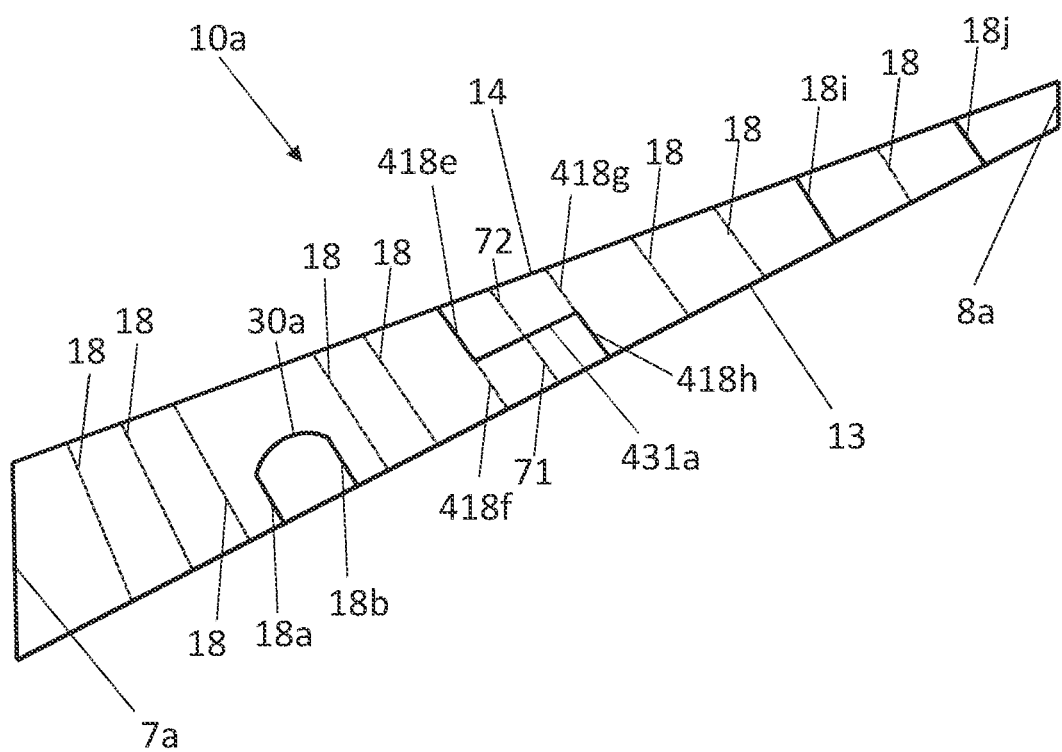
FIG. 12 shows a wing box installed with the partition of FIG. 11.

FIG. 11 shows an H-shaped modular unit 431 which may be installed in a wing box 10a as an alternative to the partition 31 as shown in FIG. 12.

The unit 431 includes a Z-shaped partition with an inboard portion 418e, an outboard portion 418h and a diaphragm 431a.

The unit 431 has an H-shaped upper flange 451 which is joined to the upper cover 15 by a sealed joint; and an H-shaped lower flange 452 which is joined to the lower cover 16 by a sealed joint. Note that the spanwise part of the H-shaped flange 452 is hidden from view by the diaphragm 431a.

The unit 431 also has a pair of rib posts 463 which are attached to the inner edges of the baffle half-ribs 71, 72.

The inboard portion 418e of the fuel partition has a planar web which extends in a substantially chordwise direction and is joined to the aft spar 14 by a fuel tight joint with a rib post (not shown). An inboard baffle rib portion 418f extends in a substantially chordwise direction and is joined to the forward spar 13 by an unsealed joint with a rib post (not shown).

The outboard portion 418h of the fuel partition has a planar web which extends in a substantially chordwise direction and is joined to the forward spar 13 by a fuel tight joint with a rib post (not shown). An outboard baffle rib portion 418g extends in a substantially chordwise direction and is joined to the aft spar 14 by an unsealed joint with a rib post (not shown).

The diaphragm 431a has a planar web which extends in a substantially spanwise direction.

All parts 418e, 431a, 418h, 451, 452, 463, 418f, 418g of the unit 431 shown in FIG. 11 are integrally formed as a single-piece. For example, the unit 431 may be machined from a block of aluminium, cast as a single-piece, or moulded as a single piece by hot isostatic pressing (HIP).

In this particular example the half-ribs 71, 72 and rib posts 73 are separately formed from the unit 431 and attached to the partition by fasteners, co-curing or co-bonding. In an alternative example, the half-ribs 71, 72 and rib posts may be formed integrally with the unit 431 as a single-piece.

The rib portions 418f, 418g each include a number of holes 19 that allow fuel to flow through the rib plane.

The unit 431, including the rib portions 418f, 418g, is configured to withstand the vertical loads transferred from the upper and lower covers.

Figure 13:
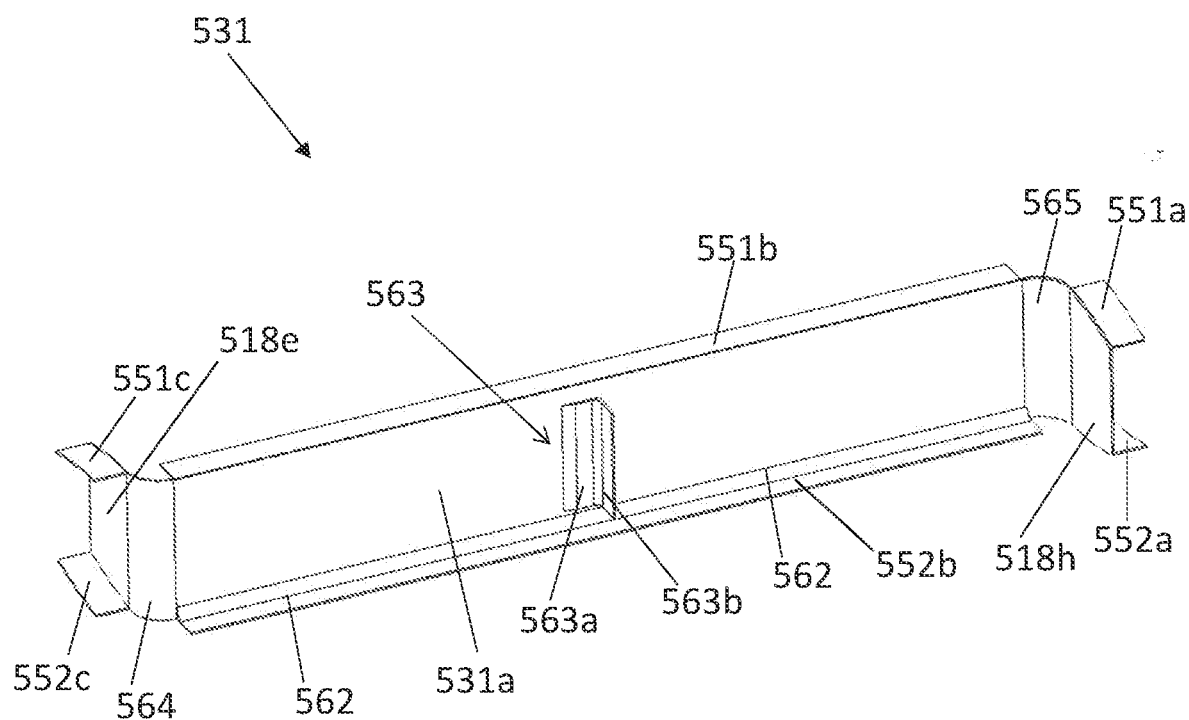
FIG. 13 shows a partition according to a fifth example.

FIG. 13 shows a fifth example of a partition 531 for forming the fuel-tight boundary between fuel tanks (for example the inner and outer fuel tanks 20, 21 shown in FIGS. 3 and 4). Like reference numerals are used to denote like parts with the partitions 31, and similar reference numerals but numbered in the 500 series are used to denote similar parts.

The partition 531 has an inboard portion 518e, an outboard portion 518h and a diaphragm 531a.

The partition 531 has upper flanges 551a, 551b, 551c which are joined to the upper cover 15 by respective sealed joints; and lower flanges 552a, 552b, 552c which are joined to the lower cover 16 by respective sealed joints.

The partition 531 also has a pair of rib posts 563. Each rib post 563 comprises a foot 563a joined to the diaphragm 531a, and a flange 563b which is attached to an inner edges of one of the baffle half-ribs 71, 72.

The inboard portion 518e has a planar web which extends in a substantially chordwise direction and is joined to the aft spar 14 by a fuel tight joint. The outboard portion 518h has a planar web which extends in a substantially chordwise direction and is joined to the forward spar 13 by a fuel tight joint.

The diaphragm 531a has a planar web which extends in a substantially spanwise direction. The partition 531 has a generally Z-shaped profile.

The inboard portion 518e, outboard portion 518h and diaphragm 531a are integrally formed as a single-piece from carbon fibre reinforced polymer (CFRP) laminate material.

The CFRP laminate material extends continuously from the inboard portion 518e to the diaphragm 531a via a curved fold region 564, and also extends continuously from the diaphragm 531a to the outboard portion 518h via a curved fold region 565. There is no need to seal the fold region 564, 565 to prevent fuel leakage.

Preferably the material comprises laminate plies and/or fibres (such as carbon fibres) which extend continuously from the inboard portion 518e to the diaphragm 531a via the curved fold region 564.

Preferably the CFRP laminate material comprises laminate plies and/or fibres (such as carbon fibres) which extend continuously from the diaphragm 531a to the outboard portion 518h via the curved fold region 565.

Optionally the CFRP laminate material comprises laminate plies and/or fibres (such as carbon fibres) which extend continuously from the inboard portion 518e to the outboard portion 518h via both curved fold regions 564, 565.

The CFRP laminate material may also extend continuously from the planar webs into the flanges 551a, 551b, 551c, 552a, 552b, 552c via respective fold regions.

The foot 563a of the rib post 563 may be formed from CFRP laminate material, and joined to the diaphragm 531a by a co-cured joint. Alternatively the foot 563a may be attached to the diaphragm 531a by fasteners.

The partition 531 may be formed from other types of composite material, including glass fibre reinforced polymer (GFRP).

The partition 531 may be formed by any suitable method, for example hand lay-up of composite plies onto a lay-up table which are then co-cured on the lay-up table under a vacuum bag and/or in an autoclave, automatic fibre placement of pre-impregnated fibre tows or courses onto a mandrel which are co-cured on the mandrel after placement, or resin transfer moulding (RTM) in which resin is injected into a dry fibre preform in a closed mould.

If the RTM process is used, then most or all of the portions of the partition 531 may be made from a single fibre preform. For example the inboard portion 518e, outboard portion 518h and diaphragm 531a may be integrally formed from a single fibre preform. The directions of the fibres may vary—being different in the diaphragm 531a than in the inboard and outboard portions for example.

It will be clear to the skilled person that many of the features described in relation to each example can be appropriately combined with the features of other examples.

FIGS. 5, 6 and 8 show a fuel-tight boundary formed between a fuel bay and a dry-bay, whilst FIGS. 9-13 show a fuel-tight boundary between adjacent fuel bays. It will be clear to the skilled person that each of the examples may be used to form the fuel-tight boundary between adjacent fuel bays or between a fuel bay and a dry-bay.

All of the partitions of FIGS. 5,6, and 8-13 may be installed in a wing box with separate spars and covers (like the wing box 10 of FIG. 2), or installed in a wing box with an integrated spar-cover (like the wing box of FIG. 7). In the wing box 10 each cover 15, 16 is attached to a flange of each spar 13, 14 by fasteners, and the cover/spar joint is sealed to make it fuel-tight (for instance by applying a fillet of sealant material). In a wing box with an integrated spar-cover each cover 15, 16 may be integrally formed with a respective one of the covers.

The inboard portion 18b, 18e, 418e, 518e of each partition is joined to each cover 15, 16 and joined to one of the spars 13, 14. Each joint may be sealed to make it fuel-tight (for instance by applying a fillet of sealant material and/or by affixing a seal plate to cover the joint).

The outboard portion 18d, 18h, 418e, 518e of each partition is joined to each cover 15, 16 and joined to the forward spar 13. Each joint may be sealed to make it fuel-tight (for instance by applying a fillet of sealant material and/or by affixing a seal plate to cover the joint).

Each cover 15, 16 is joined to the partition via a flange or flanges 151, 251, 351, 451, 551a-c, 552a-c. Each joint may be sealed to make it fuel-tight (for instance by applying a fillet of sealant material and/or by affixing a seal plate to cover the joint).

The partition 531 of FIG. 13 has upper flanges 551a, 551b, 551c which are joined to the upper cover 15 by respective sealed joints; and lower flanges 552a, 552b, 552c which are joined to the lower cover 16 by respective sealed joints. In an alternative embodiment, the partition 531 may not have the upper flanges 551a, 551b, 551c and the diaphragm 531a may instead be attached to the upper cover by stringers or rib feet which are carried by the upper cover.

The first/inboard, second/outboard and third/intermediate portions of the partition are integrally formed as a single-piece (for instance by machining, casting, pressing or resin-transfer moulding). This enables the partition to be manufactured and installed as a single modular unit, and reduces the number of joints which need to be sealed by applying sealant material.

It will be clear that many of the features described in relation to each example may be varied within the normal activity of the skilled person.

It will be clear that any of the attachment portions (e.g. feet, posts or flanges) of the partitions of any of the previous examples may be formed integrally with or separately from the partition. For example, the feet, posts or flanges may be integrally formed with the inboard, outboard and intermediate portions. In alternative examples, the feet, posts or flanges may be separately formed and subsequently attached to the partition.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing box, comprising:
   a fuel tank with a fuel-tight boundary; upper and lower covers; forward and aft spars; and a partition which provides part of the fuel-tight boundary of the fuel tank,
   the partition comprising an inboard portion, an outboard portion, and an intermediate portion between the inboard and outboard portions, wherein:
   each cover is attached to each spar;
   the inboard portion of the partition is joined to each cover and joined to one of the spars;
   the outboard portion of the partition is joined to each cover and joined to one of the spars;
   each cover is joined to the partition;
   the inboard, outboard and intermediate portions of the partition are integrally formed as a single-piece; and,
   wherein the inboard portion and the outboard portion are joined to the same one of the spars.

2. An aircraft wing box according to claim 1, wherein the covers and one or both of the spars provide part of the fuel-tight boundary of the fuel tank.

3. An aircraft wing box according to claim 1, wherein the inboard portion is joined to one of the spars and the outboard portion is joined to the other one of the spars.

4. An aircraft wing box according to claim 1, wherein the inboard portion and the outboard portion are joined to the forward spar.

5. An aircraft wing box according to claim 4, wherein the intermediate portion has a curved concave forward surface facing the forward spar and a curved convex aft surface facing away from the forward spar.

6. An aircraft wing box according to claim 1, wherein a part of the fuel-tight boundary is formed by one of the spars.

7. An aircraft wing box according to claim 1, wherein at least one of the covers is integrally formed as a single piece with at least one of the spars.

8. An aircraft wing box according to claim 1, wherein the intermediate portion of the partition comprises a diaphragm with a planar diaphragm web.

9. An aircraft wing box according to claim 1, wherein the fuel-tight boundary is a boundary between two adjacent fuel bays arranged to hold fuel, preferably an inboard fuel bay and an outboard fuel bay.

10. An aircraft wing box according to claim 1, wherein the fuel-tight boundary is a boundary between a fuel bay arranged to hold fuel and a dry bay arranged to be free of fuel.

11. An aircraft wing box according to claim 1, wherein the partition comprises at least one foot or flange attached to the upper cover and at least one foot or flange attached to the lower cover, wherein each foot or flange is integrally formed with the rest of the partition as a single-piece.

12. An aircraft wing box according to claim 1, wherein the inboard portion has a post or flange attached to one of the forward spar and aft spar, the outboard portion has a post or flange attached to one of the forward spar and aft spar, and each post or flange is integrally formed with the rest of the partition as a single-piece.

13. An aircraft wing box, comprising:
   a root and a tip, the wing box extending from the tip to the root in a spanwise direction,
   a forward spar and a aft spar spaced apart in a chordwise direction, and
   an upper cover and a lower cover each extending between the front and aft spars,
   a fuel-tight partition comprising
      a first portion extending in a substantially chordwise direction,
      a second portion extending in a substantially chordwise direction, and
      a third portion between the first and second chordwise portions and extending
      in a substantially spanwise direction,
   wherein the first, second and third portions are integral with each other,
   wherein the first portion and the second portion are joined to the same one of the front and aft spars.

14. An aircraft comprising a wing box according to claim 1.

15. A method of manufacturing the wing box of claim 1, the method comprising machining, casting, pressing, co-curing or moulding material to form the partition as a single piece; and installing the partition the partition in the wing box.

* * * * *